US009841207B2

(12) United States Patent
Park et al.

(10) Patent No.: US 9,841,207 B2
(45) Date of Patent: Dec. 12, 2017

(54) INSTALLATION GUIDE SYSTEM FOR AIR CONDITIONER AND METHOD OF USING THE SAME

(71) Applicant: LG ELECTRONICS INC., Seoul (KR)

(72) Inventors: Jungyul Park, Changwon-si (KR);
Sangeun Cho, Changwon-si (KR);
Shinae Kang, Changwon-si (KR);
Junmo Kim, Changwon-si (KR);
Mingyu Park, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 631 days.

(21) Appl. No.: 14/072,110

(22) Filed: Nov. 5, 2013

(65) Prior Publication Data
US 2014/0148957 A1    May 29, 2014

(30) Foreign Application Priority Data
Nov. 27, 2012  (KR) .......................... 10-2012-0135403

(51) Int. Cl.
*F24F 11/00* (2006.01)
*G06F 17/50* (2006.01)

(52) U.S. Cl.
CPC ...... *F24F 11/0086* (2013.01); *G06F 17/5004* (2013.01); *G06F 2217/06* (2013.01); *G06F 2217/34* (2013.01)

(58) Field of Classification Search
CPC .................................................. F24F 11/0086
(Continued)

(56) References Cited

U.S. PATENT DOCUMENTS

| 4,551,810 A | 11/1985 | Levine |
| 5,557,537 A | 9/1996 | Normann et al. |

(Continued)

FOREIGN PATENT DOCUMENTS

| CN | 101067315 | 11/2007 |
| CN | 101923587 | 12/2010 |

(Continued)

OTHER PUBLICATIONS

International Search Report dated Apr. 4, 2014 issued in application No. PCT/KR 2013/010813.

(Continued)

*Primary Examiner* — Christopher E Everett
(74) *Attorney, Agent, or Firm* — Ked & Associates, LLP

(57) ABSTRACT

Provided are an installation guide system for an air conditioner and a method of using the same. The installation guide system for an air conditioner may include a memory that stores at least one image for a building in which an air conditioner installed, and a display providing a user interface to design a disposition of the air conditioner in the building. The user interface may include a first region that provides a recommended configuration of indoor units to be installed based on a type of an indoor unit of the air conditioner or load information for a prescribed room in which the indoor unit is installed. The user interface may also include a second region that displays the stored image of the building and a graphical image for the indoor units in the image of the building based on the recommendations provided in the first region.

8 Claims, 14 Drawing Sheets

(58) Field of Classification Search
USPC .......................................................... 700/276
See application file for complete search history.

(56) References Cited

U.S. PATENT DOCUMENTS

| | | | |
|---|---|---|---|
| 7,702,421 B2* | 4/2010 | Sullivan | F24F 11/0009 236/51 |
| 8,249,841 B1* | 8/2012 | Ferrer | G06F 17/50 703/2 |
| 8,260,581 B2 | 9/2012 | Hoguet | |
| 2005/0109047 A1* | 5/2005 | Park | F24F 11/0086 62/125 |
| 2005/0165591 A1 | 7/2005 | Bahel et al. | 703/7 |
| 2006/0247902 A1* | 11/2006 | Rourke | G06F 17/5004 703/1 |
| 2007/0186149 A1 | 8/2007 | Ghantous | |
| 2007/0219764 A1* | 9/2007 | Backe | G06F 17/5004 703/6 |
| 2007/0288207 A1 | 12/2007 | Backe et al. | 703/1 |
| 2008/0015824 A1 | 1/2008 | Grichnik et al. | |
| 2008/0209907 A1 | 9/2008 | Xiao et al. | 60/641.15 |
| 2008/0309678 A1 | 12/2008 | Reghetti et al. | |
| 2009/0024374 A1 | 1/2009 | Zielinski et al. | 703/8 |
| 2009/0076779 A1 | 3/2009 | Simmons et al. | |
| 2009/0307255 A1* | 12/2009 | Park | G06Q 10/10 |
| 2010/0066559 A1 | 3/2010 | Judelson | |
| 2010/0138762 A1 | 6/2010 | Reghetti et al. | |
| 2010/0217724 A1 | 8/2010 | Wayne et al. | |
| 2010/0223032 A1 | 9/2010 | Reghetti et al. | |
| 2012/0072181 A1 | 3/2012 | Imani | 703/1 |
| 2012/0101778 A1 | 4/2012 | Gyota et al. | 702/183 |
| 2013/0261805 A1* | 10/2013 | Kuroiwa | F24F 11/0086 700/276 |

FOREIGN PATENT DOCUMENTS

| | | | |
|---|---|---|---|
| CN | 102033992 | 4/2011 | |
| CN | 102782689 | 11/2012 | |
| EP | 1 939 813 A1 | 7/2007 | |
| EP | 2 442 042 A1 | 4/2012 | |
| JP | 2009530720 A | 8/2009 | |
| JP | WO 2012101787 A1 * | 8/2012 | .......... F24F 11/0086 |
| KR | 10-2002-0002894 | 1/2002 | |
| WO | WO 2010/143340 A1 | 12/2010 | |

OTHER PUBLICATIONS

European Search Report dated Apr. 14, 2014 issued in application No. 13171829.8.
U.S. Office Action dated May 12, 2016 issued in co-pending U.S. Appl. No. 14/071,940.
U.S. Office Action dated Apr. 29, 2016 issued in co-pending U.S. Appl. No. 14/072,045.
Korean Office Action dated Dec. 11, 2015 issued in Application No. 10-2012-0135501.
Chinese Office Action dated Jun. 17, 2016 issued in Application No. 2013800085785.
Chinese Search Report dated Jun. 21, 2016 issued in Application No. 2013800085770.
Korean Office Action dated Jul. 12, 2016 issued in Application No. 10-2012-0135403.
Chinese Office Action dated Jul. 19, 2016 issued in Application No. 201380008599.7.
U.S. Office Action dated Aug. 16, 2016 issued in co-pending U.S. Appl. No. 14/072,045.
U.S. Notice of Allowance dated Jun. 30, 2017 issued in co-pending U.S. Appl. No. 14/071,940.
U.S. Office Action dated May 10, 2017 issued in co-pending U.S. Appl. No. 14/072,045.
U.S. Office Action dated Oct. 19, 2016 issued in co-pending U.S. Appl. No. 14/071,940.

* cited by examiner

| | Name | Height | |
|---|---|---|---|
| ▶ | First floor bottom | 0 | |
| | Second floor bottom | 4000 | |
| | Rooftop | 8000 | |
| | First floor ceiliing | 3000 | |
| | Second floor ceiling | 7000 | |
| | Duct level | 3400 | |
| | Shoulder height | 5500 | |
| | Head height | 6000 | |

Height designation

FIG.5

| Total information | Room information | | Actual area | CAD area | Cooling conduction unit | Cooling conduction load | Cooling sensible unit | Cooling sensible load | Heating conduction unit | Heating conduction load | Indoor unit cooling performance | Indoor unit heating performance |
|---|---|---|---|---|---|---|---|---|---|---|---|---|
| First floor bottom | | | | | | | | | | | | |
| Second floor bottom | | | | | | | | | | | | |
| | | Room1 | 507.30 | 4.3785 | 0.175 | 8.2477 | 0 | | 0.175 | 88.778 | 0 | 0 |
| | | Room2 | 556.93 | 4.8069 | 0.175 | 9.0546 | 0 | | 0.175 | 97.463 | 0 | 0 |
| | | Room3 | 571.81 | 4.9353 | 0.175 | 9.2966 | 0 | | 0.175 | 100.06 | 0 | 0 |
| | | Room4 | 10877.7 | 93.885 | 0.175 | 176.85 | 0 | | 0.175 | 1903.6 | 0 | 0 |
| | | Room5 | 718.65 | 6.2026 | 0.175 | 11.6838 | 0 | | 0.175 | 125.76 | 0 | 0 |
| | | Room6 | 653.58 | 5.6410 | 0.175 | 10.626 | 0 | | 0.175 | 114.37 | 0 | 0 |
| | | Room7 | 1385.9 | 11.962 | 0.175 | 22.533 | 0 | | 0.175 | 242.54 | 0 | 0 |
| | | Room8 | 1886.0 | 16.278 | 0.175 | 30.663 | 0 | | 0.175 | 330.05 | 0 | 0 |
| Rooftop | | | | | | | | | | | | |
| First floor ceiling | | | | | | | | | | | | |
| Second floor ceiling | | | | | | | | | | | | |
| Level6 | | | | | | | | | | | | |
| Duct level | | | | | | | | | | | | |
| Shoulder height | | | | | | | | | | | | |
| Head height | | | | | | | | | | | | |

230

[ OK ]  [ Apply ]  [ Close ]

FIG.6

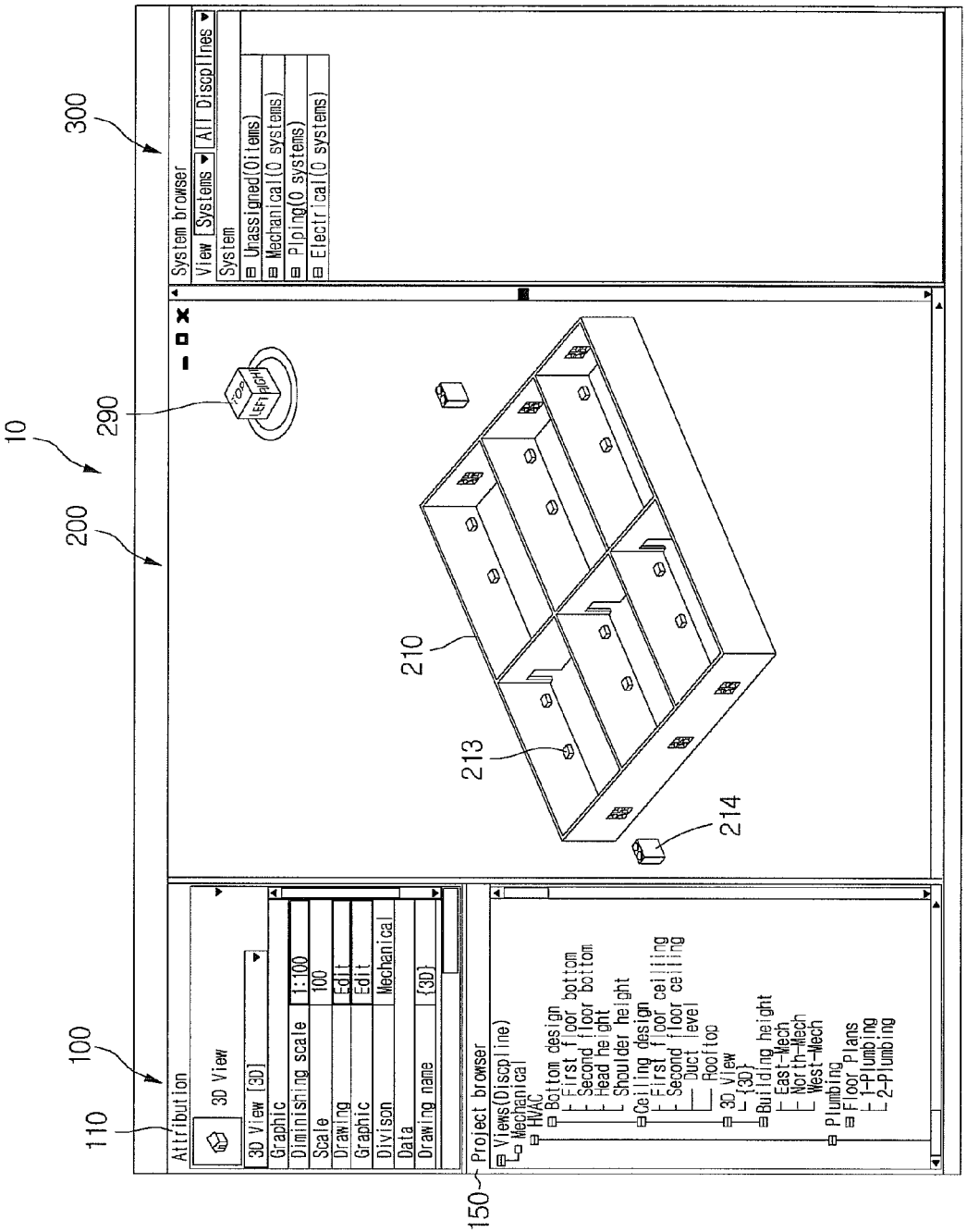

INSTALLATION GUIDE SYSTEM FOR AIR CONDITIONER AND METHOD OF USING THE SAME

CROSS-REFERENCE TO RELATED APPLICATION(S)

This application claims priority under 35 U.S.C. §119 to Korean Application No. 10-2012-0135403 filed in Korea on Nov. 27, 2012, whose entire disclosure is hereby incorporated by reference.

BACKGROUND

1. Field

Provided is an installation guide system for an air conditioner and a method of using the same.

2. Background

Installation guide systems for air conditioner and methods of using the same are known. However, they suffer from various disadvantages.

Air conditioners are home appliances that maintain indoor air into the most proper state according to use and purpose thereof. For example, such an air conditioner cools indoor air in the summer and heats indoor air in the winter. Furthermore, the air conditioner may control humidity of the indoor air and may purify the indoor air to provide a more pleasant and clean air.

In detail, the air conditioner has a refrigeration cycle in which compression, condensation, expansion, and evaporation processes for a refrigerant are performed. Thus, a cooling or heating operation of the air conditioner may be performed to cool or heat the indoor air according to the refrigeration cycle.

Such an air conditioner may be classified into a split type air conditioner in which indoor and outdoor units are separated from each other and an integral type air conditioner in which indoor and outdoor units are integrally coupled to each other as a single device, according to whether the indoor and outdoor units are separated from each other.

The outdoor unit includes an outdoor heat exchanger heat-exchanging with external air, and the indoor unit includes an indoor heat exchanger heat-exchanging with indoor air. The air conditioner may operate in a cooling mode or heating mode which are capable of being converted with respect to each other.

An air conditioner may be installed so that a plurality of indoor or outdoor units may be provided in one building. Particularly, in a case of a commercial air conditioner, high-capacity outdoor units may be disposed outside the building, and indoor units may be installed so that the indoor units are respectively disposed in a plurality of spaces of the floors (also referred to herein as levels).

In the air conditioner according to the related art, an adequate number of indoor or outdoor units may be provided in consideration of a size and structure of the building and the number of persons to be accommodated within the building so that the indoor or outdoor units are adequately designed in a building design phase to adequately locate the indoor or outdoor units in the building. Also, while the building is being designed, the adequate number of outdoor or indoor units should be selected in consideration of the conditions of the building. In addition, a position of a refrigerant tube, a branch tube, or drain tube and a constitution of a controller should be considered.

However, according to the process of designing the air conditioner in the building, a design drawing of the building and a design drawing of the air conditioner are drawn along different work flows. Thus, since the plurality of drawings may not match each other, it may be difficult to efficiently design the building and install the air conditioner.

Also, since communication between an installer and a user with respect to installation information (building information or capacity of the air conditioner) of the air conditioner may not effectively be performed, the number of outdoor and indoor units which are actually required may not be provided, or the refrigerant tube and the like may not be disposed in adequate positions in the building.

Also, in the case where the air conditioner is not adequately installed in the building, cooling or heating efficiency of the air conditioner may be reduced during the operation thereof or may cause failures.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 3 is a view of a height designation display part according to an embodiment;

FIG. 5 is a view of a room information display part according to an embodiment;

FIG. 6 is a view of an indoor unit automatic disposition display part according to an embodiment;

FIG. 9 is a view of an installation guide system including the drawing display part on which the indoor unit is automatically disposed according to an embodiment;

DETAILED DESCRIPTION

Reference will now be made in detail to the embodiments of the present disclosure, examples of which are illustrated in the accompanying drawings. The disclosure may, however, be embodied in many different forms and should not be construed as being limited to the embodiments set forth herein; rather, that alternate embodiments included in other retrogressive disclosures or falling within the spirit and scope of the present disclosure will fully convey the concept of the disclosure to those skilled in the art.

Figure 1:
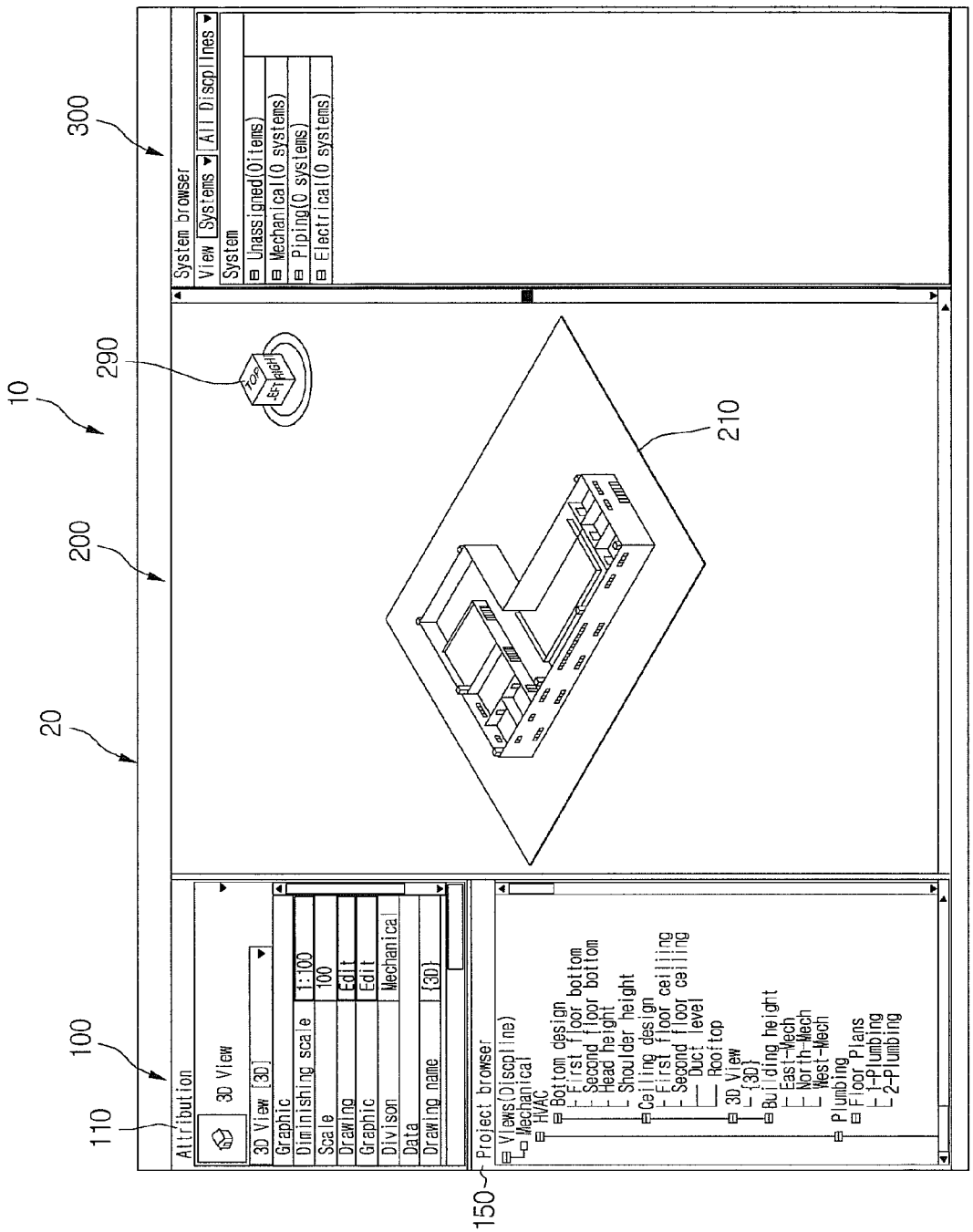
FIG. 1 is a view of an installation guide system according to an embodiment.

FIG. 1 is a view of an installation guide system according to an embodiment. An installation guide system 10 (hereinafter, referred to as a system) may include a display 20 providing guide for an installation (a disposition design) of an air conditioner to a user. The display 20 may be displayed when preset information (e.g., specific program) is executed. The display 20 may be understood as a user interface that outputs information required according to a command input of the user. Here, the specific program may be executed in PCs, terminals, servers, control devices, or another appropriate type of computing device based on the intended application.

The display 20 may include an installation information display part 100 including attribution information of the system 10, project (installation process) information for installing the air conditioner, and information (for example, building information) related to an installation space in which the air conditioner is installed. The installation information display part 100 may be disposed in a partitioned region of the display 20. The installation information display part 100 may be a partitioned window, a window pane, a pop-up window, or the like.

In detail, the installation information display part 100 may include an attribution information display part 110 ("Attribution") on which the attribution information of the system 10 is displayed. The attribution display part 110 may include display information with respect to a drawing included in the system 10. For example, the display information may include drawing scale information, graphic information, and scale information, or the like.

The installation information display part 100 may include a project display part 150 ("Project Browser") on which information with respect to floor and ceiling designs of the building and information with respect to a height of the building are displayed.

The project display part 150 may include a display part (hereinafter, also referred to as a bottom design display part) for confirming or inputting information with respect to the bottom design of the building. For example, when the building has two floors, the bottom design display part may include information with respect to a "first floor bottom," a "second floor bottom," a "head height," and a "shoulder height."

The project display part 150 may include a display part (hereinafter, also referred to as a ceiling design display part) for confirming or inputting information with respect to the ceiling design of the building. For example, when the building has two floors, the ceiling design display part may include information with respect to a "first ceiling mech" and a "second ceiling mech." Also, the two floor ceiling mech may include information with respect to a "duct level (height)" and a "rooftop," for example.

The project display part 150 may include a display part (hereinafter, also referred to as a building height display part) for confirming or inputting information with respect to the height of the building. The building height display part may include a plurality of selection parts for distinguishing and displaying the height of the building according to a view direction. The plurality of selection parts may include an "east-mech" selection part, a "west-mech" selection part, and a "north-mech" selection part.

The display 20 may include a drawing display part 200 on which information with respect to an installation space of the air conditioner, for example, floor information of the building or room information may be displayed, or disposition information of detailed devices (equipment or components) of the air conditioner may be displayed. The room information may be information with respect to rooms partitioned on each of the floors of the building. Moreover, the drawing display part 200 may be referred to as a window, a pane, partition of the display, or the like, which may be separated in the display 20 or viewed as a pop-up window.

A drawing with respect to a structure of the building may be disposed on the drawing display part 200, and installation information may be displayed on the drawing. The drawing display part 200 may be displayed on the other region of the entire region of the display 20. For example, as shown in FIG. 1, the drawing display part 200 may include a building perspective view 210 on which the structure of the building is three-dimensionally displayed.

Information with respect to a plurality of buildings may be previously stored in the system 10. When one building of the plurality of buildings is imported, as shown in FIG. 1, a structure of a specific building may be displayed as a perspective view.

The drawing display part 200 may include a viewer adjustment part 290 for adjusting a view direction of the building perspective view 210. The user may select the viewer adjustment part 290 to rotate in a specific direction, thereby differently setting the view angle of the building perspective drawing 210. The viewer adjustment part 290 may be an icon, or the like.

The display 20 may include a product information display part 300 ("System Browser") for displaying the detailed constitutions (equipment or components) of the air conditioner disposed in each of the floors or each of the rooms. The product information display part 300 may be displayed in the other region of the entire region of the display 20.

For example, the display 20 may be divided into three regions. Thus, the installation information display part 100, the drawing display part 200, and the product information display part 300 may be disposed in each of the three regions, respectively. Also, the installation information display part 100 and the product information display part 300 may be disposed on both sides of the drawing display part 200.

The installation information display part 100 and the product information display part 300 may be commonly called a "guide display part" in that various menus for disposing the air conditioner on the drawing display part 200 are displayed thereon.

Figure 2:
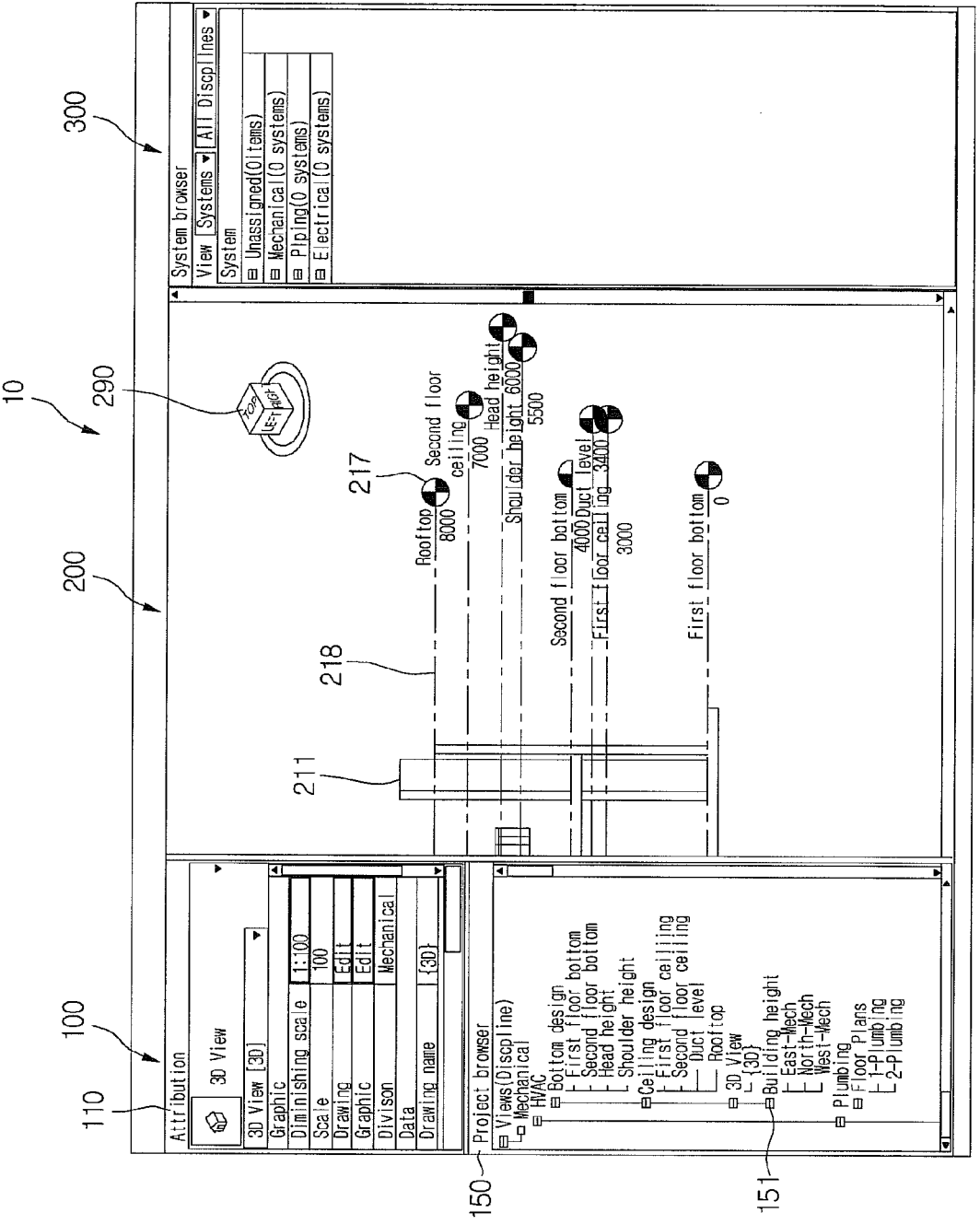
FIG. 2 is a view of the installation guide system with respect to a drawing display part including building level information according to an embodiment.

FIG. 2 is a view of the installation guide system with respect to a drawing display part including building level information according to an embodiment, and FIG. 3 is a view of a height designation display part according to an embodiment.

A front view 211 and height information with respect to the bottom and floor of the building based on the front view 211 may be displayed on the drawing display part 200. Of course, the drawing and the height information may be previously stored in the system 10.

For example, when the building height display part 151 of the project display part 150 is selected, at least one portion of the front view 211 of the building may be displayed on the drawing display part 200, and the information with respect to a height from the bottom of the building to the rooftop of the building may be displayed in a region spaced apart from where the front view 211 is displayed.

For example, when the building has two floors, a plurality of position display parts 217 may be displayed in regions spaced laterally from the front view 211. Positions of components of the building from the "first floor bottom" that is the lowermost portion relative to the "rooftop" that is the uppermost portion may be longitudinally displayed.

That is, the position display parts 217 are displayed in a vertical direction to correspond to the components of the building displayed on the front view 211 of the building, as illustrated in FIG. 2. The position display parts 217 may include a "first floor bottom," a "first floor ceiling," a "duct level," a "second floor bottom," a "shoulder height," a "head height," a "second ceiling", a "rooftop" from a lower side to an upper side, or another appropriate measurement.

Also, heights (levels) with respect to each of the components of the building may be displayed on the position display parts 217, respectively. For example, as shown in FIG. 2, the first floor bottom, the first ceiling, the duct level, the second floor bottom, the shoulder height, the head height, the second floor ceiling, and the rooftop may be displayed as about 0, about 3,000 mm, about 3,400 mm, about 4,000 mm, about 5,500 mm, about 6,000 mm, about 7,000 mm, and about 8,000 mm, respectively.

Here, the shoulder height and the head height may be utilized as reference information for installing the air conditioner. For example, the shoulder height and the head may correspond to a height of a window provided in the building or a position of an air discharge hole of the air conditioner.

Level display lines 218 that horizontally extend from the front view 211 to the position display parts 217 may be displayed on the drawing display part 200. The plurality of level display lines 218 may be longitudinally disposed and spaced apart from each other to correspond to the respective components (the rooftop, the ceiling, the bottom, and the like) of the building.

Since the level display lines 218 are provided, the components of the building illustrated in the front view 211 and names of the components displayed on the position display parts 217 may easily be matched to each other. Also, since the information with respect to the height of each of the components of the building is displayed on the drawing display part 200 so that the user can see the height information, the air conditioner may be easily and accurately installed.

A height designation display part 220 is illustrated in FIG. 3. The height designation display part 220 may be displayed in a pop-up window when one region of the drawing display part 200 is selected. For example, the one region may be a region in which a front view 211 of the building, a position display part 217, and a level display part 218 are displayed. Also, the one region may be selected by clicking an input device included in a PC, a terminal, a server, or a control device, for example, a mouse. Alternatively, a specific input part included in the system 10 may be inputted to display the height designation display part 220. For example, a button or icon may be provided.

The height designation display part 220 may include information with respect to components of the building and corresponding height of the components. The information included in the height designation display part 220 may correspond to the information with respect to the level included in the position display part 217 of FIG. 2. Also, the information with respect to the height may be previously stored in the system 10 and also changed by the user.

Figure 4:
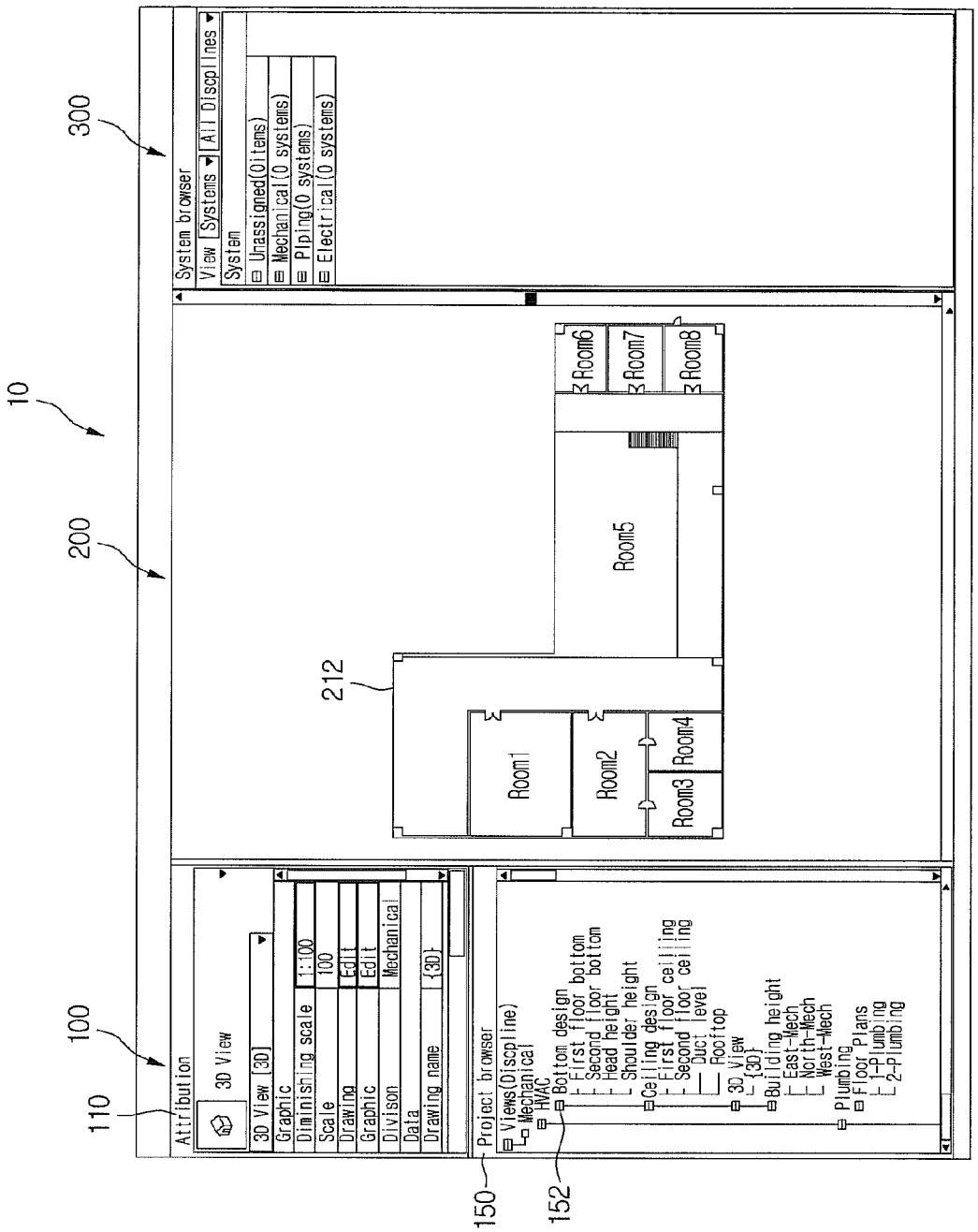
FIG. 4 is a view of the installation guide system with respect to a drawing display part including a building plan view according to an embodiment.

FIG. 4 is a view of the installation guide system with respect to a drawing display part including a building plan view according to an embodiment, and FIG. 5 is a view of a room information display part according to an embodiment.

A building plan view 212 may be displayed on the drawing display part 200 of the system 10. In detail, when a bottom design display part 152 of the project display part 150 is selected, the room information with respect to each of the rooms of the building may be displayed on the drawing display part 200. For example, FIG. 4 illustrates a state in which the building plan view 212 including the room information of the second floor of the building when the "second floor bottom" of the bottom design display part is selected.

Also, when an inner region of the building plan view 212 is selected, a room information display part 230 may be displayed as shown in FIG. 5. Alternatively, a specific input part included in the system 10 may be inputted to display the room information display part 230. The room information display part 230 may include information with respect to a room set in each of the floors of the building, for example, a cooling/heating load or capacity of the indoor unit.

As described above, since the information with respect to the room in which the air conditioner is installed may previously be set, the indoor or outdoor unit having specific capacity may be adequately disposed on the basis of the information with respect to the room.

Figure 6:
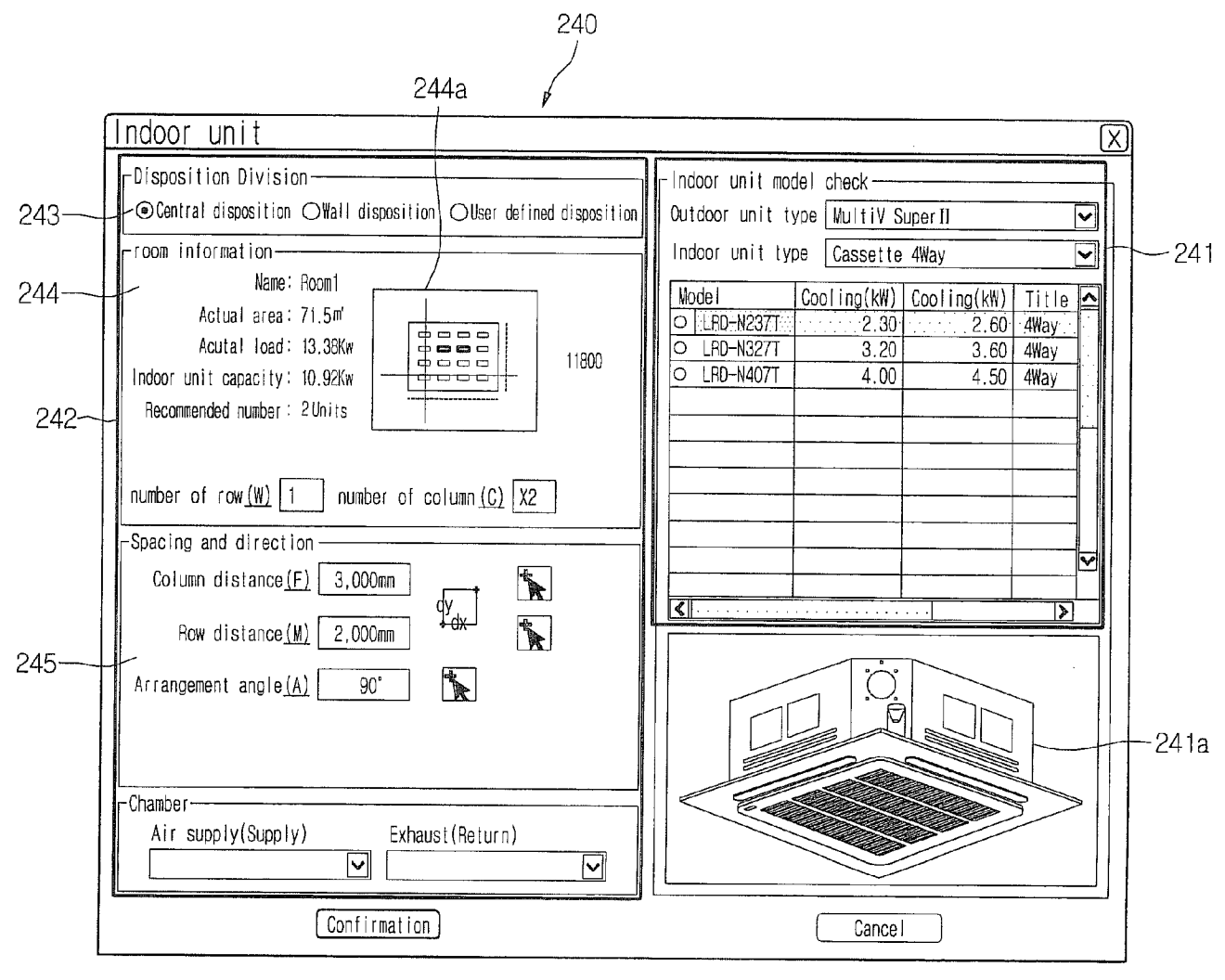
Figure 7:
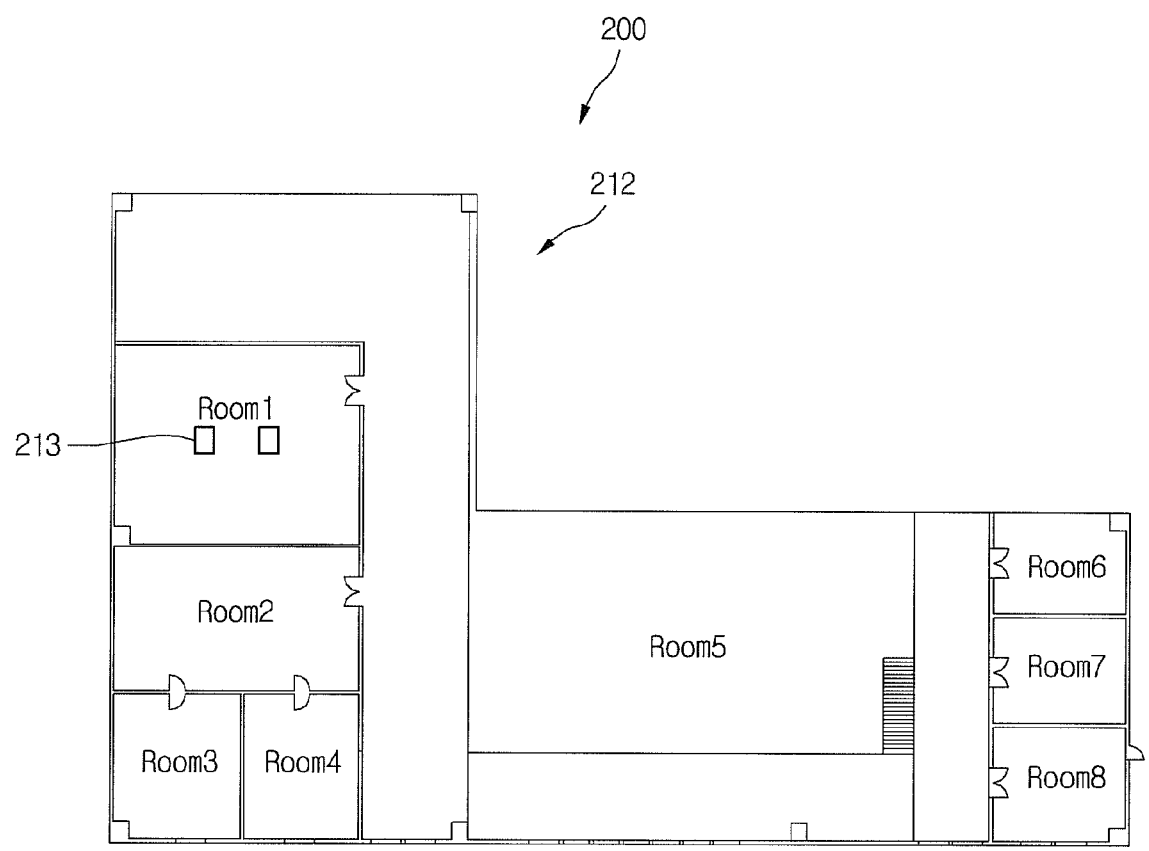
FIGS. 7 and 8 are views of a drawing display part on which an indoor unit is automatically disposed according to an embodiment.
Figure 8:
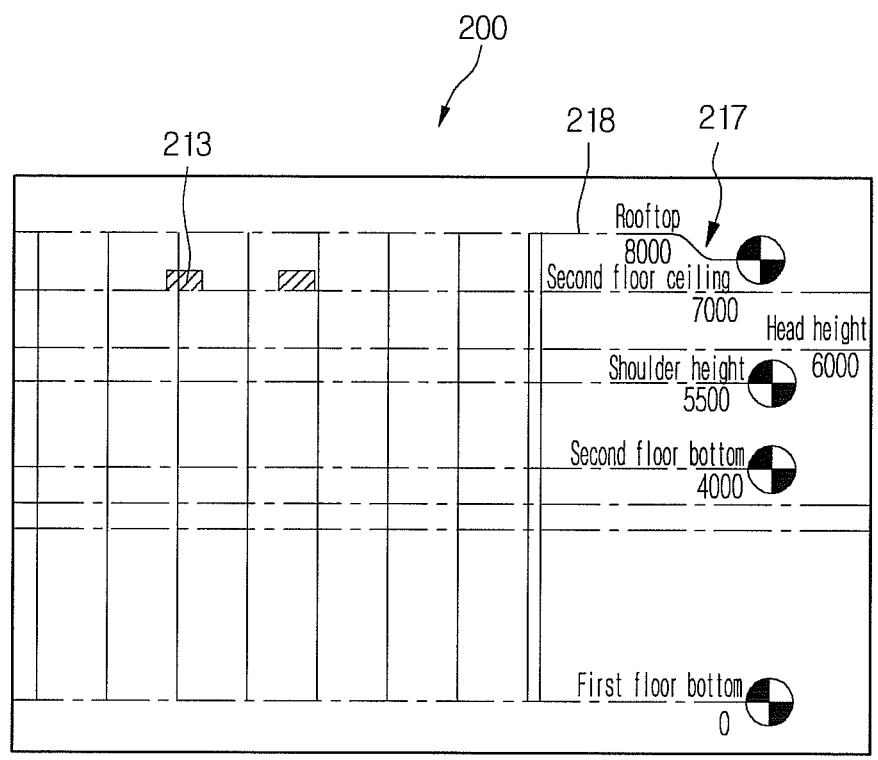

FIG. 6 is a view of an indoor unit automatic disposition display part according to a first embodiment, and FIGS. 7 and 8 are views of a drawing display part on which the indoor unit is automatically displayed according to an embodiment.

When a specific input part included in the system 10 is inputted, as shown in FIG. 6, an indoor unit automatic disposition display part 240 may be displayed on the display 20. The indoor unit automatic disposition display part 240 may include a model display part 241 for selecting a type or model of the indoor unit to be installed, a shape display part 241a on which a shape of the indoor unit having the model selected in the model display part 241 is displayed, and a disposition information display part 242 on which disposition information with respect to the indoor unit having the selected model.

The disposition information display part 242 may include a disposed position of the indoor unit, e.g., a disposition division display part 243 ("Disposition Division") for selecting whether the indoor unit is installed at a center of the room or on a wall, a room information display part 244 ("Room Information") for displaying information of a room in which the indoor unit is installed, and an arrangement set display part 245 ("Spacing and Direction") for displaying information with respect to a disposition distance of the indoor unit.

The disposition division display part 243 may include a plurality of selectable disposition divisions. The plurality of disposition divisions may include a "central disposition" in which the selected indoor unit is disposed with respect to a center of the corresponding room, a "wall disposition" in which the selected indoor unit is disposed with respect to four directional walls, and a "user defined disposition" in which a user sets a disposition reference point of the indoor unit.

A room area and load information (e.g., actual load information) and information with respect to capacity of the indoor unit may be disposed on the room information display part 244. In detail, when one model of the indoor unit is selected through the model display part 241, capacity information with respect to the selected model (indoor unit), area information with respect to the room, and load information may be displayed.

Also, an optimum number of selected indoor units to be installed in the corresponding room may be recommended on the basis of the above-described information. That is, the "recommended number" of selected indoor units may be displayed on the room information display part 244. Thus, since the recommended number of indoor units that should be disposed and how the indoor units should be arranged according to the capacity of the indoor, the actual area, and the load information, are provided, user convenience may be improved.

Information with respect to column and row of the indoor units to be disposed, e.g., information with respect to the number C of columns and the number W of rows may be inputted into the room information display part 244. The number C of columns and the number W of rows may be previously determined as predetermined values according to the recommended number and then displayed on the room information display part 244. That is, the number of indoor units to be installed and the information C and W with respect to the column and row may be recommended to the user. However, the user may change the information to reflect a desired number of columns and rows.

The room information display part 244 may include a plan disposition view 244*a* that illustrates a plan disposition of the indoor units according to the recommended number and the number C and W of columns and rows. The information with respect to the columns and rows of the indoor units, e.g., the C*W values may be understood as the number of indoor units to be installed. The recommended number and the inputted indoor unit number C*W may correspond to each other or be different from each other. When the recommended number and the indoor unit number C*W are different from each other, the indoor units may be disposed according to the number C*W of the indoor units inputted by the user and the column and row information.

Also, when the number of indoor units recommended by the system 10 and the column and row information and the information inputted or adjusted by the user are different from each other, the arrangement of the indoor units installed according to the information inputted by the user may be displayed on the plan disposition view 244*a*.

Information with respect to how the inputted indoor unit number C*W are arranged, e.g., arrangement information may be displayed on the arrangement set display part 245. The arrangement information may include a distance F (hereinafter, referred to as a column distance) between one indoor unit and the other indoor unit which constitute the columns, a distance M (hereinafter, referred to as a row distance) between one indoor unit and the other indoor unit which constitute the rows, and an angle A (hereinafter, referred to as an arrangement angle) of the column of the indoor unit to the wall of the room with respect to the column and row information.

The information with respect to the column distance F, the row distance M, and the arrangement angle A may be inputted. Also, the indoor units may be automatically disposed in the corresponding rooms on the basis of the information inputted into the arrangement set display part 245. Moreover, the information with respect to the arrangement angle A may be changed. Since the arrangement angle A may be corrected to simply change the arrangement of the indoor units, the disposition design of the indoor units may be made easier.

As described above, since the indoor units may be automatically disposed in the corresponding rooms when the type and model of the indoor unit to be installed by the indoor unit automatic disposition system, it may not be necessary to dispose the indoor units one by one on the drawing display part 200 by the user.

A process of inputting data to the indoor unit automatic disposition display part 240 is be described with reference to FIGS. 4 and 6. The user may select one room in which the indoor unit is installed on the building plan view 212 of FIG. 4. The selection may be performed by designating a predetermined region along a boundary between the rooms, e.g., an outer boundary by using a mouse. For example, as shown in FIG. 4, Room 1 of a plurality of rooms may be designated.

The user may select one type of indoor unit from the "outdoor unit type" displayed on the model display part 241 and then select one type of indoor unit that matches the selected indoor from the "indoor unit type." For example, as shown in FIG. 4, a "Multi V Super II" may be selected from the "outdoor unit type," a "Cassette 4 Way" may be selected from the "indoor unit type."

When one type of indoor unit is selected from the "indoor unit type," a plurality of indoor unit models belonging to the selected type may be displayed. When one model of the plurality of indoor unit models is selected, a shape of the indoor unit having the selected model may be displayed on the shape display part 241*a*. As illustrated in the example of FIG. 6, the model of the selected indoor unit may be a "ceiling type indoor unit" installed on a ceiling.

The user may select a desired disposition division from the disposition division display part 243 (e.g., a central disposition, as shown in FIG. 4). Information with respect to the selected Room 1, e.g., the room area, the room load, and the capacity of the selected indoor unit may be displayed on the room information display part 244.

Also, the adequate number of indoor units to be installed may be recommended and displayed on the room information display part 244 on the basis of the information with respect to the Room 1 and the capacity of the indoor unit (two indoor units in FIG. 4). The user may input or correct the columns and rows of the indoor units according to the recommended number of indoor units.

The information with respect to the specific column distance, row distance, and arrangement angle may be displayed on the arrangement set display part 245 according to the set number of indoor units and the room area. However, the user may correct the information with respect to the column and row distances and the arrangement angle.

As described above, when a "confirmation button" is selected after the information displayed on the indoor unit automatic disposition display part 240 is confirmed or inputted, as shown in FIG. 6, the indoor units may be automatically disposed in the corresponding rooms of the building plan view (212), as shown in FIG. 7. Here, the user may designate the region (the installation region of the indoor unit) corresponding to the Room 1 on the drawing display part 200.

For example, as shown in FIG. 7, two indoor units may be disposed spaced apart from each other, on a central portion of the ceiling of the Room 1. Also, two indoor unit display parts 213 corresponding to the indoor units may be displayed to be within the displayed boundary of Room 1.

When the building height display part 151 of the project display part 150 is selected in the state where the indoor units are automatically disposed, as shown in FIG. 6, the level or height of each of components of the building and a configuration of the ceiling type indoor unit may be displayed on the drawing display part 200.

In detail, FIG. 8 illustrates a state in which the indoor unit display part 213 is disposed on a ceiling of the second floor at a height of about 7,000 mm (about 23 feet) that is spaced upward from the first floor bottom. Here, as described in FIG. 2, the plurality of level display lines 218 and the position display part 217 may be disposed on the drawing display part 200.

FIG. 9 is a view of the installation guide system including the drawing display part on which the indoor unit is automatically disposed according to an embodiment. When the indoor units are automatically disposed in the plurality of rooms through the method described in FIGS. 6 to 8, the building perspective view 210 including the plurality of indoor unit display parts 213 may be displayed on the drawing display part 200.

Also, an outdoor unit display part 214 may be displayed on an outer region of the building perspective view 210 on the drawing display part 200. The outdoor unit display part 214 may be understood as the outdoor unit corresponding to the automatically disposed indoor unit which are displayed.

The disposition of the outdoor unit may be performed before or after the indoor unit of FIGS. 4 to 6 is automatically disposed. When a model of the outdoor unit to be installed is selected, and a predetermined region (an installation position region) is set on the drawing display part 200, the outdoor unit display part 214 may be disposed in the predetermined region of the drawing display part 200.

The viewer adjustment part 290 may be disposed on a side of the building perspective view 210. When the viewer adjustment part 290 is selected to rotate in a predetermined direction, the building perspective view 210 may be changed in shape according to the rotation direction. As described above, the viewer adjustment part 290 may be adjusted to easily confirm the installed configurations of the indoor and outdoor units within the building.

Figure 10A:
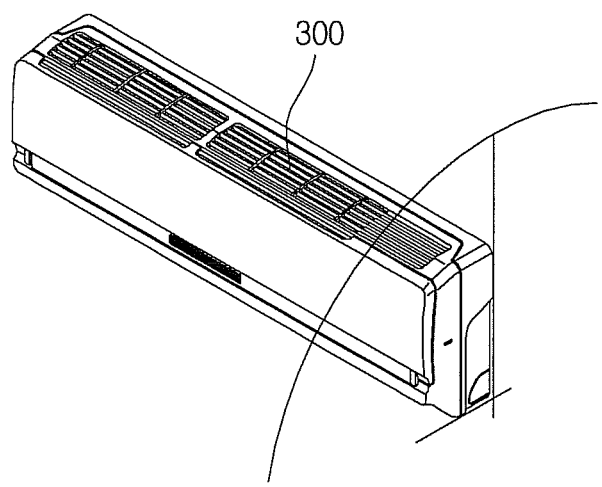
FIGS. 10A and 10B are views illustrating configuration of an indoor unit and a disposition of the indoor unit within a room according to an embodiment.
Figure 10B:
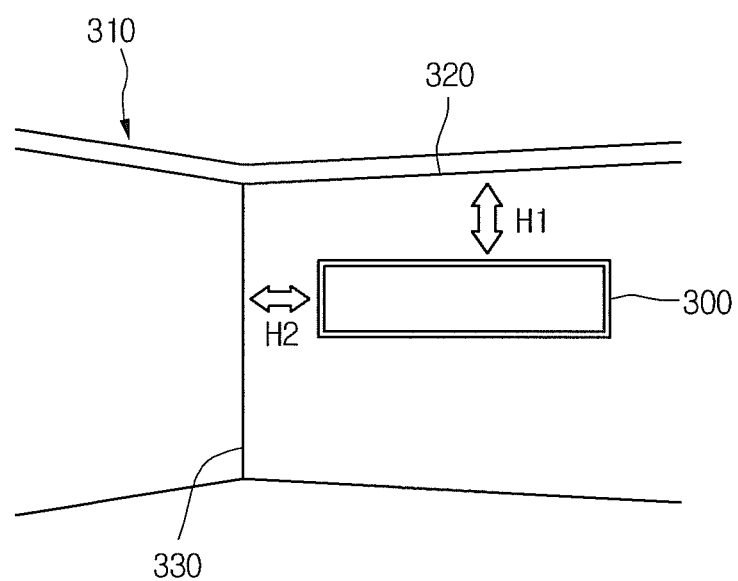

FIGS. 10A and 10B are views illustrating constitutions of an indoor unit and a disposition of the indoor unit within a room according to one embodiment. Referring to FIG. 10A, a wall mount-type indoor unit 300 may be installed in the system 10. That is, the wall mount type indoor unit 300 may be installed on a wall of the building in addition to the ceiling-type indoor unit as previously described.

The wall mount-type indoor unit 300 may be selected on the model display part 241 of the indoor unit automatic disposition display part 240 of FIG. 6. When a model of the wall mount-type indoor unit is selected, and disposition information of the wall mount type indoor unit is inputted through the disposition information display part 242, the wall mount-type indoor unit 300 may be displayed on the drawing display part 200 as an indoor unit display part. That is, the wall mount-type indoor unit 300 may be disposed on the plan view of the building, the level display drawing, and the perspective view of the building which are described in FIGS. 7 to 9.

Here, the wall mount-type indoor unit 300 may be automatically disposed according to preset installation conditions. For example, as shown in FIG. 10B, the wall mount-type indoor unit 300 may be installed to be spaced a predetermined distance from the ceiling 320 and corner 330 of a wall surface within a room 310 of the building.

For example, the wall mount-type indoor unit 300 may be previously set so that an upper portion of the wall mount-type indoor unit 300 is spaced a distance H1 from the ceiling 320 and spaced a distance H2 from the corner 330. Here, the distances H1 and H2 may have values of about 200 mm or more and about 100 mm or more, respectively. As a result, while the predetermined number of wall mount-type indoor units 300 that are selected in FIG. 6 are automatically disposed with a set arrangement or distance within the room 310, the wall mount-type indoor units 300 may be disposed according to the preset installation conditions.

Figure 11A:
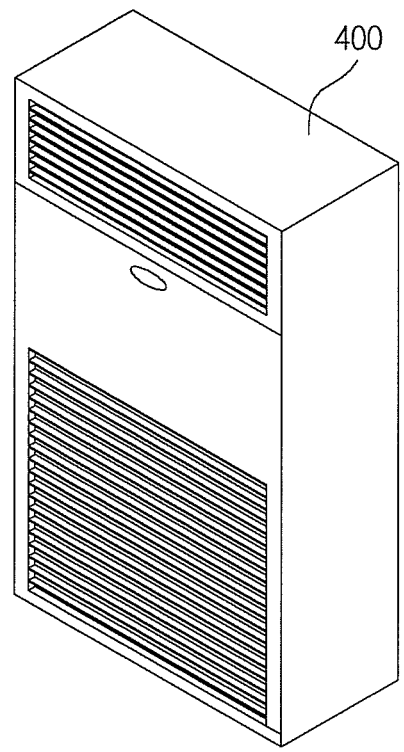
FIGS. 11A and 11B are views illustrating configuration of an indoor unit and a disposition of the indoor unit within a room according to another embodiment.
Figure 11B:
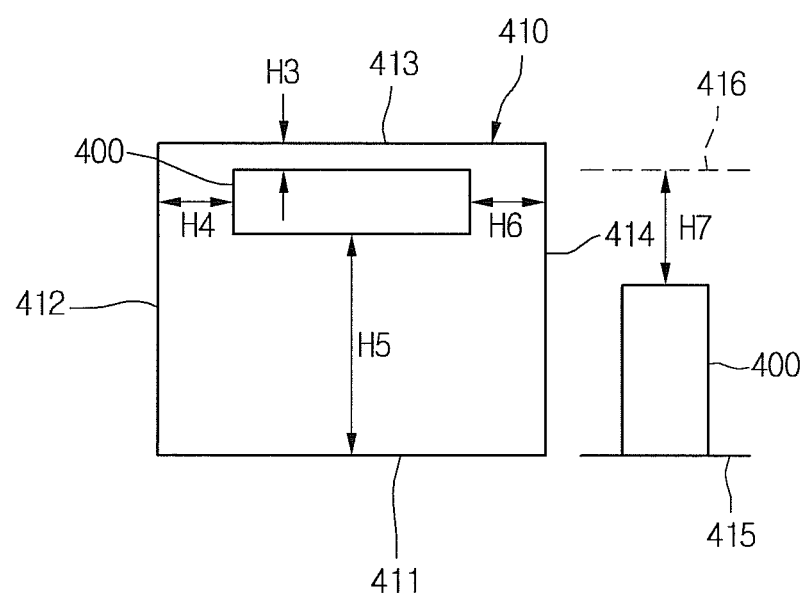

FIGS. 11A and 11B are views illustrating configuration of an indoor unit and a disposition of the indoor unit within a room according to another embodiment. Referring to FIG. 11A, a stand-type indoor unit 400 may be selected on the model display part 242 of the indoor unit automatic disposition display part 240 of FIG. 6. When a model of the stand-type indoor unit is selected, and disposition information of the stand-type indoor unit is inputted through the disposition information display part 242, the stand-type indoor unit 400 may be displayed on the drawing display part 200 as an indoor unit display part. That is, the stand-type indoor unit 400 may be disposed on the plan view of the building, the level display drawing, and the perspective view of the building which are described in FIGS. 7 to 9.

Here, the stand-type indoor unit 400 may be automatically disposed according to preset installation conditions. For example, as shown in FIG. 11B, the stand-type indoor unit 400 may be installed to be spaced a predetermined distance from each of the four wall surfaces 411, 412, 413, and 414 within a room 410 of the building when viewed from a plan view. An inner space of the room 410 may be defined by the four wall surfaces 411, 412, 413, and 414.

For example, the stand-type indoor unit 400 may be previously set so that the stand-type indoor unit 400 is spaced a distance H5 from the first wall surface 411, spaced a distance H4 from the second wall surface 412, spaced a distance H3 from the third wall surface 413, and spaced a distance H6 from the fourth wall surface 414. Here, the distances H3, H4, H5, and H6 may have values of about 20 mm or more, about 100 mm or more, about 1,000 mm or more, and about 100 mm or more, respectively.

Also, in a state where the stand-type indoor unit 400 stands up on a bottom surface 415, the stand-type indoor unit 400 may be disposed to be spaced a distance H7 from the ceiling 416. Here, the distance H7 may have a value of about 175 mm or more. These distances H3, H4, H5, H6, H7 may be minimum values which are recommended for each type of unit and/or application.

As a result, while the predetermined number of stand-type indoor units 400 that are selected in FIG. 6 are automatically disposed with a set arrangement or distance within the room 410, the stand-type indoor units 400 may be disposed according to the preset installation conditions.

Figure 12:
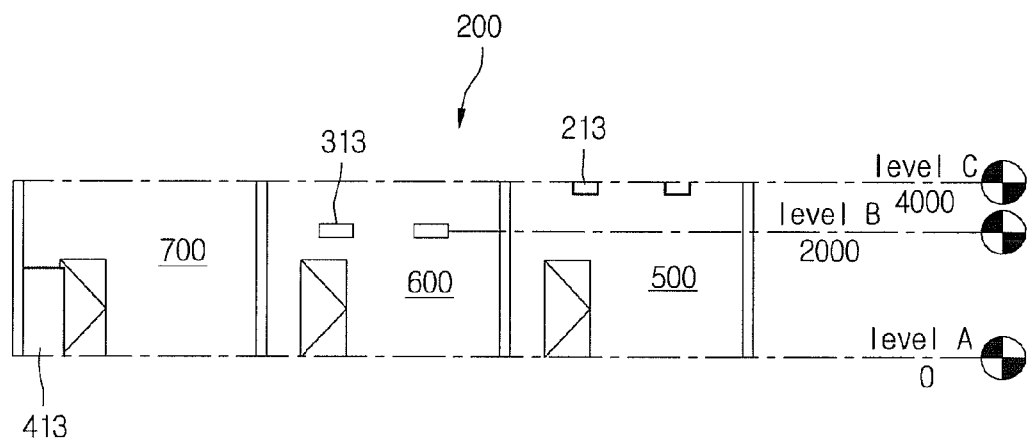
FIGS. 12 and 13 are views of a drawing display part on which a plurality of indoor units are disposed according to an embodiment.
Figure 13:
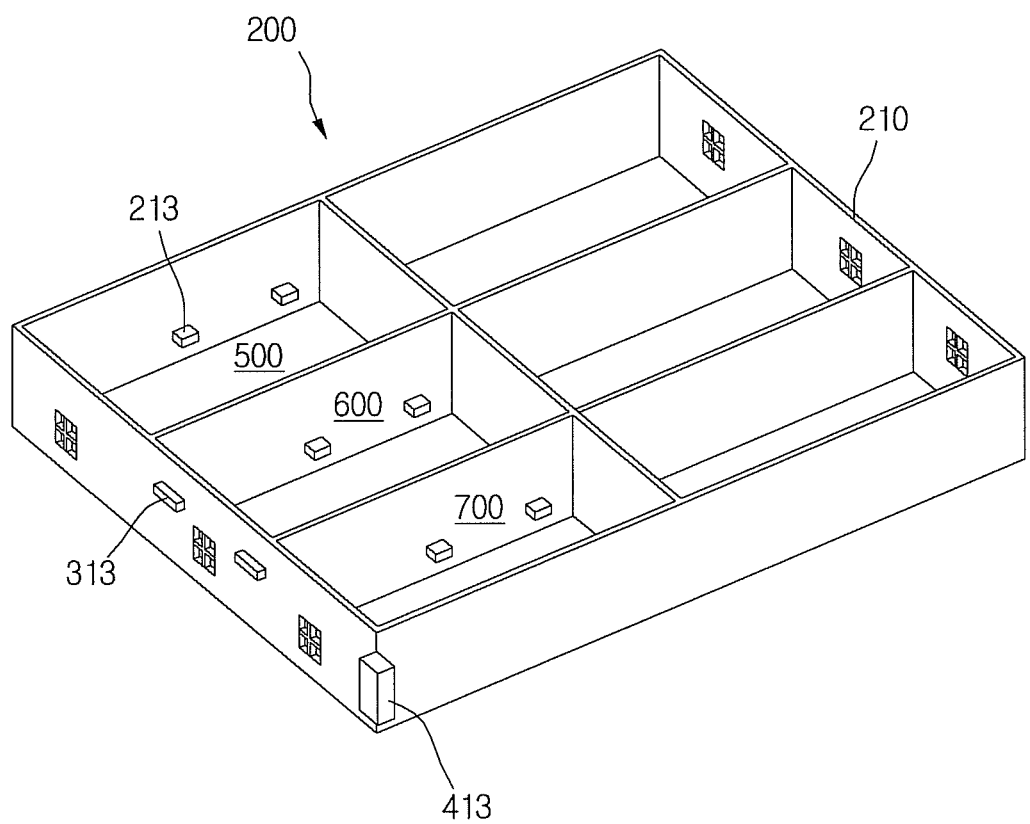

FIGS. 12 and 13 are views of a drawing display part on which a plurality of indoor units are disposed according to an embodiment. The ceiling-type indoor unit, the wall mount-type indoor unit, and the stand-type indoor unit may be disposed in different rooms, respectively.

A first indoor unit display part 213 that represents the ceiling-type indoor unit may be installed at a level C (about 4,000 mm) of a first room 500, a second indoor unit display part 313 that represents the wall mount-type indoor unit may be installed at a level B (about 2,000 mm) of a second room 600, and a third indoor unit display part 413 that represents the stand-type indoor unit may be installed at a level A (about 0 mm) of a third room 700.

That is, each of the indoor units may be disposed at a set position of a specific room through the above-described processes of FIGS. 6 to 11. Also, after all of the indoor units are disposed, the disposition states of the plurality of indoor units may be displayed on the drawing display part 200. FIG. 12 is a front view of the building that illustrates the levels (height) of the indoor units, and FIG. 13 is a perspective view that illustrates the disposition states of the indoor units with respect to the building structure.

As described above, when the model of the indoor unit is selected, information with respect to the number of indoor units to be installed and arrangement of the indoor units may be recommended on the basis of capacity (performance) of the indoor unit and/or load information of the room. Then, the indoor unit may be automatically disposed according to the recommended information or the information may be adjusted or corrected by a user. Thus, a design for the installation of the indoor unit may be more easily performed.

Figure 14:
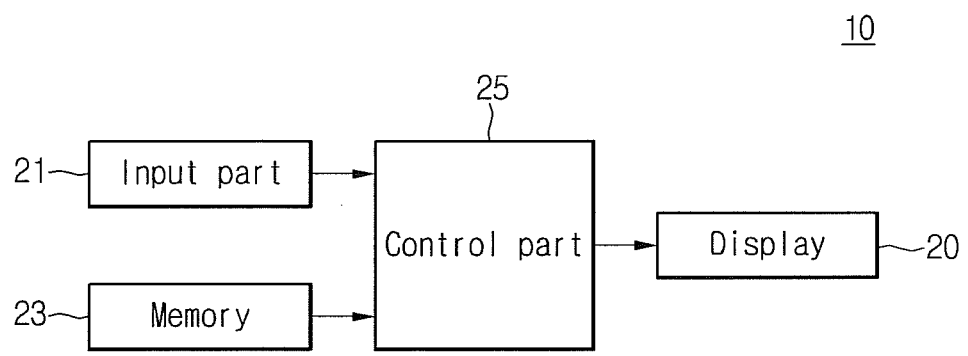
FIG. 14 is a block diagram of the installation guide system according to an embodiment.

FIG. 14 is a block diagram of the installation guide system according to an embodiment. An installation guide system 10 according to an embodiment includes an input part 21 (input device) to input a predetermined command for disposition design of an air conditioner, a memory 23 to store information with respect to a space in which the air conditioner is installed, a display 20 to display a process for the disposition design of the air conditioner, and a control part 25 to control the components.

The input part 21 may include a keyboard or mouse for a computer. However, as long as a user's command can be inputted into the installation guide system 10, any input device may be allowable.

Drawing information including at least one of information of a building in which the air conditioner is installed, floor information, and room information may be stored in the memory 23. The drawing information may be received from a customer (e.g., landlord or building designer) and then stored in the system 10.

When the disposition of the air conditioner is designed, the drawing information may be displayed on the display 20, for example, the drawing display part 200. Also, the ceiling-type indoor unit, the wall mount-type indoor unit, or the stand-type indoor unit together with the drawing information may be displayed on the drawing display part 200 according to the contents described above.

As broadly described and embodied herein, in the installation guide system of the air conditioner, since the installation conditions of the building may be stored as an actual drawing with respect to the building, and then the air conditioner may be selected or installed adequate for the stored installation conditions, the air conditioner may be optimally installed adequate for the installation conditions of the building.

Also, since the number of indoor units to be installed may be decided or recommended by calculating required cooling/heating capacity on the basis of the space information or use information (heat generation rate information) of the building, the air conditioner may be easily installed.

Also, since the indoor units may be automatically disposed on the basis of the actual area and load information of the room in which the air conditioner is installed and the information with respect to the selected indoor unit, the indoor unit may be easily designed and disposed.

Also, since the installation guide system of the air conditioner is provided as a drawing program, the designer may easily manipulate the drawing. In detail, since the main menu in which the installation information and product information may be viewed at a glance as provided on the display of the system, and the results obtained by selecting detailed menus of the main menu may be confirmed from the drawing, the design process may be accurately performed.

Embodiments, as broadly described herein, provide an air conditioner installation guide system for guiding installation of an air conditioner and a method of using the same. In one embodiment, an installation guide system for an air conditioner includes: a memory storing drawing information of a building in which the air conditioner installed; and a display providing a user interface to design a disposition of the air conditioner, wherein the display includes: an automatic disposition display part recommending the number of indoor unit to be installed on the basis of a kind of indoor unit constituting the air conditioner or load information of a room in which the indoor unit is installed; and a drawing display part displaying the drawing information of the building and information with respect to an installation position of the indoor unit.

In another embodiment, a using method of an installation guide system for an air conditioner includes: displaying a drawing display part including drawing information of a building; defining an region of a room, in which an indoor unit is installed, in the drawing information of the building; selecting a kind of indoor unit to be installed in the room; recommending and displaying the number of indoor unit to be installed, on the basis of information with respect to capacity of the indoor unit and information with respect to the room; and displaying the indoor unit on the drawing display part according to the decided number of indoor unit to be installed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An installation guide system for an air conditioner, the installation guide system comprising:
    a memory that stores at least one image for a building in which an air conditioner installed; and
    a display providing a user interface to design a disposition of the air conditioner in the building, the display comprising:
    a first display part including installation information for installing the air conditioner and information related an installation space in which the air conditioner is installed;
    a second display part including equipment information of the air conditioner; and
    a third display part that is disposed between the first and the second display parts and displays the stored image of the building and a graphical image for indoor units and outdoor units,
    wherein the user interface includes a disposition display part that provides a recommended configuration of the indoor units to be installed, and
    wherein the disposition display part comprises:
        a room information display part that displays load information for a prescribed room in which the indoor units are installed, information with respect to capacity of the indoor units, recommended number of the indoor units and information with respect to a number of column and row of the indoor unit, which are changeable, and an arrangement set display part that displays arrangement information, which includes a column distance between one indoor unit and another indoor unit which constitute the column, a row distance between the one indoor unit and the another indoor unit which constitute the row and an arrangement angle of the column of the indoor unit to a wall of the room with respect to column and row information, wherein:

when a command is inputted through the disposition display part, the third display part displays a front view in which a plurality of level display lines horizontally extend, the plurality of level display lines being spaced apart in a vertical direction, the plurality of level display lines indicate relative heights of a floor and a ceiling of a particular floor of the building on which the indoor units are installed, and a relative height of a human body, and the front view includes values with respect to the heights of the floor and the ceiling of the particular floor in which the indoor units are installed, and the height of the human body and an indoor unit display part disposed on the ceiling of the particular floor.

2. The installation guide system according to claim 1, wherein the displayed image of the building displayed in the third display part includes an image of a room in which the indoor units are installed, and the graphical image for the indoor units includes an indication for a horizontal position of the indoor units relative to at least one wall in the room.

3. The installation guide system according to claim 2, wherein the horizontal position of the indoor units relative to at least one wall in the room is determined based on previously stored values corresponding to a type of the indoor units.

4. The installation guide system according to claim 1, wherein the indoor units displayed on the image in the third display part includes at least two indoor units of a ceiling-type indoor unit, a wall mount-type indoor unit, or a stand-type indoor unit, and the graphical image for the indoor units displays the indoor units being installed at different heights.

5. The installation guide system according to claim 1, wherein a boundary of an area for installing the indoor units is set using the image displayed in the third display part, and a type of the indoor units is selectable in the disposition display part based on the boundary is set in the third display part.

6. The installation guide system according to claim 1, wherein the third display part includes a selectable object to control a perspective of the displayed image of the building and the graphical image of the indoor units.

7. The installation guide system according to claim 1, wherein the perspective of the displayed image is controlled to change an orientation of the image of the building and the graphical image of the indoor units.

8. The installation guide system according to claim 1, wherein the relative height of the human body includes relative heights of a head and a shoulder.

\* \* \* \* \*